United States Patent [19]

Yamagisi et al.

[11] 4,190,454

[45] Feb. 26, 1980

[54] CEMENT RETARDER AND RAPID HARDENING CEMENT CONTAINING THE SAME

[75] Inventors: Hirosi Yamagisi; Shozo Sakamaki; Koji Nakagawa; Minoru Sirasawa, all of Oumi, Japan

[73] Assignee: Denki Kagaku Kogyo Kabushiki Kaisha, Tokyo, Japan

[21] Appl. No.: 919,163

[22] Filed: Jun. 26, 1978

[30] Foreign Application Priority Data

Oct. 20, 1977 [JP] Japan .................................. 52-126334

[51] Int. Cl.$^2$ ............................................... C04B 7/35
[52] U.S. Cl. ........................................ 106/90; 106/97; 106/315
[58] Field of Search .......................... 106/315, 90, 97

[56] References Cited

U.S. PATENT DOCUMENTS

| | | | |
|---|---|---|---|
| 3,656,985 | 4/1972 | Bonnel et al. | 106/315 |
| 3,782,984 | 1/1974 | Allemand et al. | 106/315 |
| 4,032,353 | 6/1977 | Bail et al. | 106/315 |

*Primary Examiner*—James Poer
*Attorney, Agent, or Firm*—Paul J. Sutton

[57] ABSTRACT

A cement retarder is provided which comprises 5 to 20% by weight, based on the weight of said retarder, of gluconic acid and/or tartaric acid and/or a water soluble salt thereof, 30 to 10% by weight, based on the weight of said retarder, of citric acid and/or an alkali salt thereof, and 50 to 85% by weight, based on the weight of said retarder, of an alkali carbonate. A rapid hardening cement is also provided which contains the above cement retarder.

11 Claims, 3 Drawing Figures

Calcium Sulfate Ratio 1.5

CEMENT RETARDER AND RAPID HARDENING CEMENT CONTAINING THE SAME

BACKGROUND OF THE INVENTION

1. Field of the Invention

This invention relates to a cement retarder and a rapid hardening cement containing the same and more particularly to a cement retarder composed of three components and a rapid hardening cement containing such a retarder.

2. Prior Art

There have hereto been various proposals for a cement retarder used for a rapid hardening cement containing calcium sulfate and an amorphous calcium aluminate such as $12CaO \cdot 7Al_2O_3$ or $11CaO \cdot 7Al_2O_3 \cdot CaF_2$. Such retarders include, for example organic acids, borates, silicofluorides and the like. However, these retarders do not meet all the requirements called for as a cement retarder. The requirements are:

(1) that the handling time of a rapid hardening cement (i.e. a period of time starting from the time at which a rapid hardening cement is mixed with water to the setting time, which will be hereinafter referred to as H.T.) can be controlled within a wide range and practically this range should be from 10 to 60 minutes.

(2) that the H.T. of a rapid hardening cement should be in proportion to the amount of a cement retarder added.

(3) that a cement retarder shall not adversely affect the initial strength of a rapid hardening cement within the order of hours.

(4) that a cement retarder shall not cause pollution problems.

More specifically, borates and silicofluorides have good retarding effects. However, these compounds do not exhibit satisfactory initial strength and, to make matters worse, they are poisonous. Organic acids such as gluconic acid, citric acid, tartaric acid or malic acid are also inferior in the initial strength when solely used, whereas when used in combination with alkali carbonates this drawback can be avoided. Nevertheless, the requirement mentioned in item (2) above still remains unsolved, that is, the H.T. of the cement containing such retarders can not be controlled in proportion to the added amount of the retarders.

OBJECTS AND SUMMARY OF THE INVENTION:

It is an object of this invention to provide a cement retarder and a rapid hardening cement containing the same, the handling time of which can be controlled within a sufficiently wide range.

It is another object of this invention to provide a cement retarder and a rapid hardening cement containing the same, the handling time of which can be controlled in proportion to the added amount of the retarder.

It is a further object of this invention to provide a cement retarder and a rapid hardening cement containing the same which are excellent in obtaining sufficient initial strength.

It is yet a further object of the invention to provide a cement retarder and a rapid hardening cement containing the same which will not cause any pollution problem.

The above and other objects of the invention will become apparent from the following description.

According to the invention, a cement retarder is provided which comprises 5 to 20% by weight, based on the weight of said retarder, of gluconic acid and/or tartaric acid and/or a water soluble salt thereof, 30 to 10% by weight, based on the weight of said retarder, of citric acid and/or an alkali salt thereof, and 50 to 85% by weight, based on the weight of said retarder, of an alkali carbonate. A rapid hardening cement is also provided which contains the above cement retarder.

Figure 1:
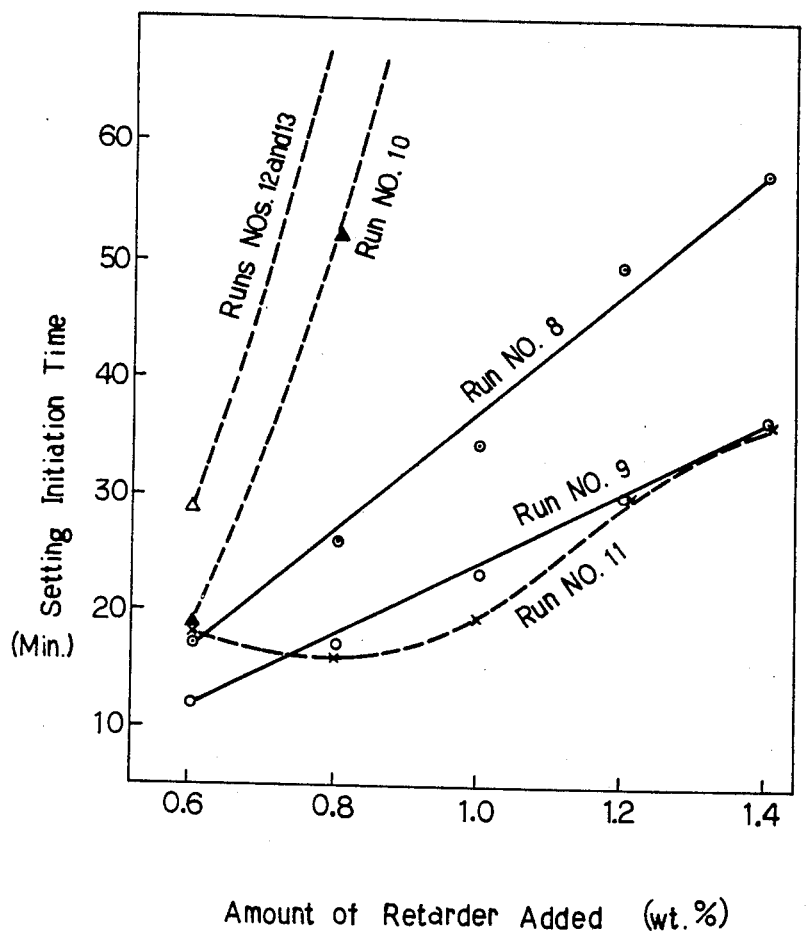
FIG. 1 is a graph showing the setting initiation time in terms of the added amount of a retarder, wherein the respective curve numbers correspond to the Run numbers in Example 2 (Table 3).

DESCRIPTION OF THE INVENTION:

The invention will be further illustrated in detail.

The amount of gluconic acid and/or tartaric acid and/or a water soluble salt thereof should be 5 to 20% by weight based on the weight of the cement retarder. When used in an amount of less than 5% by weight, sufficient retarding effects cannot be obtained. On the contrary, above 20% by weight, the setting time is abruptly prolonged so that the H.T. of the cement cannot be controlled in proportion to the amount of the retarder to be added. In addition, satisfactory initial strength cannot be obtained. The water soluble salt of gluconic acid and/or tartaric acid includes, for example sodium gluconate, potassium gluconate, calcium gluconate, sodium tartrate, potassium tartrate and calcium tartrate.

The amount of citric acid and/or an alkali salt thereof should be 10 to 30% by weight based on the weight of the cement retarder. Where less than 10% by weight is used, the H.T. of the cement cannot be controlled in proportion to the added amount of the retarder, whereas where more than 30% by weight is used, the H.T. of the cement cannot be controlled within a wide range. The alkali salt of citric acid includes, for example sodium citrate, potassium citrate and calcium citrate.

The amount of alkali carbonate to be incorporated should be in the range of 50 to 85% by weight based on the weight of the retarder. In an amount of less than 50% by weight, the initial strength of the cement to be obtained becomes inferior, while on the contrary above 85% by weight, the H.T. of the cement will not be controlled within a wide range. The alkali carbonate includes, for example sodium carbonate, potassium carbonate, sodium hydrogencarbonate and potassium hydrogencarbonate and calcium carbonate. The alkali metal carbonates are particularly preferred.

The amount of the cement retarder of the invention to be incorporated into the rapid hardening cement may preferably be 0.3 to 1.5% by weight based on the total amount by weight of the rapid hardening cement. When less than 0.3% by weight is used, the H.T. of the cement is insufficient. In more than 1.5% by weight, the initial strength of the cement to be obtained within the order of hours becomes inferior.

Into the rapid hardening cement according to the invention, there may preferably be incorporated a cement rapid hardening agent comprising an amorphous calcium aluminate and an inorganic sulfate in an amount of 1 to 3 times by weight as that of the amorphous calcium aluminate, the chemical composition of the amorphous calcium aluminate consisting essentially of 35 to 47% by weight of calcium oxide based on the weight of the amorphous calcium aluminate and the balance of aluminum oxide. The inorganic sulfate may more preferably be added in an amount of 1.5 to 2.5 times by weight as that of the amorphous calcium aluminate. The chemical composition of the amorphous calcium aluminate may more preferably consist essentially of 38 to 44% by wieght of calcium oxide based on the weight of the amorphous calcium aluminate and the balance of aluminum oxide.

In the present invention, the usable calcium aluminate is limited to the amorphous form since the crystallized calcium aluminate is inferior in obtaining strength in an early stage. The amorphous calcium aluminate specified throughout the specification means the one which does not substantially exhibit a diffraction peak when analysed by X-ray diffractiometry, and may be produced by mixing a raw calcareous material with a raw aluminous material in a ratio stoichiometrically equivalent to the composition of the calcium aluminate to be prepared, melting the same, and thereafter rapidly cooling by means of cooling with water or blowing with a compressed gas.

One or more of inorganic sulfates, such as dihydrate, hemihydrate and anhydride of calcium sulfate, sodium sulfate, potassium sulfate and magnesium sulfate, may be used in the present invention, preferable sulfate being those which are insoluble or scarcely soluble in water, such as Type II anhydrous calcium sulfate. For example, Type II anhydrous calcium sulfate containing sulfuric acid which is a by-product when producing phosphoric acid or fluoic acid may preferably be used.

The specific surface area of the cement rapid hardening agent used in the present invention is not limited, and those having the Blaine value of about 2000 $cm^2/g$ may be satisfactorily used and those having the Blaine value of 4000 to 7000 $cm^2/g$ are preferred.

Further, in accordance with the present invention, the H.T. of the cement may be considerably prolonged and the early stage strength within a time period of the order of hours may be increased and stabilized by adding to the cement rapid hardening agent 2% by weight or less of water based on the weight of the above cement rapid hardening agent. If the water content is out of the above defined range, the advantageous effects stated above can not be expected. In particular, if the added amount of water is too large, it becomes difficult to uniformly disperse water in the cement rapid hardening agent. The method of admixing water is not limited. For example, water may be added to the cement rapid hardening agent and immediately mixed together in a ball mill or the like, or the cement rapid hardening agent is allowed to contact with steam.

The added amount of the cement rapid hardening agent with or without admixed water may preferably range 5 to 25% by weight based on the total amount by weight of the cement. The examples of usable cements include ordinary Portland cement, high early strength Portland cement, super rapid hardening Portland cement and moderate heat Portland cement and those mixed with silica, fly ash, blast furnace slag or the like.

The rapid hardening cement containing the retarder according to the invention has a sufficient wide range of the handling time and exhibits high initial strength within the order of hours. At the same time, the handling time can be controlled in proportion to the amount of the retarder to be added. Furthermore, the cement retarder of the invention is not poisonous. Hence, the present invention may be applied to general construction works, water-stopping agents, grouting materials for improving soils, slab track construction works and secondary concrete products. The present invention is particularly advantageous when applied to the production of concrete moldings wherein centrifugal molding is employed in this excellent function effect can be obtained. In general, concrete moldings formed by centrifugal molding are conventionally subjected to steam curing after molded by the centrifugal molding. However, according to the present invention, molded bodies may be demolded after ageing for several hours and the steam curing step may be dispensed with. Besides, the strength after ageing for one to two weeks of the molded body produced in accordance with the present invention may be increased about two times as high as that obtained after ageing for one day, only by curing in water or curing in air while preventing drying-up by means of sprinkling with water.

The result of a test production, wherein a small diameter concrete pipe is produced, shows that with the use of the cement rapid hardening agent of the present invention the pipe can be formed at the high rotational speed of 1000 rpm for 2 minutes, the same pipe has hitherto been produced under the operational condition of 1200 rpm for 3 minutes. Similarly, in the process for making a medium or large diameter pipe, the time period required from the beginning of charging concrete to the completion of finishing is shortened so that the pipe may be produced for 30 to 40 minutes according to the present invention, otherwise it would take about an hour.

Alternatively, the cement rapid hardening agent by itself or a cement enriched therewith may be used at the end portions of the concrete molding and in the vicinities of the interior and exterior surfaces to strengthen such portions and surfaces, in order to prevent damages, otherwise occurring at the demolding step and to reinforce the surfaces which are subjected to the strongest stress due to the external compressive force.

Furthermore, according to the present invention, it is possible to make concrete moldings made by compacting concrete by means of centrifugal forces, such as a concrete pipe, pile and pole and a composite body composed of a steel concrete pipe, with lowered centrifugal forces for a short period of time, whereby the problem caused by noises can be eliminated.

Further advantage of the invention is that the steam curing operation is not required so that the molded body may be demolded immediately after the molding step after ageing for only a short period of from several hours to about one day, which is allowed to stand for about 1 to 3 days to obtain the strength ready for shipping, i.e. the strength withstands the external pressure. As a result, the steam curing room, the operation of carrying the molded articles in and out of the curing room, the maintenance operation of a boiler and the apparatus for processing exhaust gases may be dispensed with.

The present invention will now be described with reference to examples thereof. Percents (%) and parts appearing throughout the following examples mean percents by weight and parts by weight.

EXAMPLE 1

47.8 kg of quick lime and 52.2 kg of bauxite white were put into a small-sized electric furnace and melted at a temperature higher than 1700° C., and the molten mixture was blown off with air to be rapidly cooled to obtain an amorphous fused material composed of 42.4% of CaO, 48.5% of $Al_2O_3$, 3.1% of $SiO_2$ and 0.6% of other components. The amorphous fused material was pulverized using a small-sized ball mill into a powder having a specific surface area of 4520 $cm^2/g$ (represented by the Blaine value). A cement rapid hardening agent was prepared by dry-blending 100 parts of the thus obtained powder with 200 parts of a Type II anhydrous calcium sulfate which was substantially free of water and the Blaine value of which was 5890 $cm^2/g$.

The cement rapid hardening agent was admixed with water and initimately mixed therewith to prepare an admixture the water content of which was 0.15%. Similarly, admixtures containing, respectively, 0.30% and 0.80% of water were prepared.

In order to measure the H.T. and the strengths obtainable within a unit time period of the cements added with these cement rapid hardening agents, 10 parts each of these cement rapid hardening agents was mixed with 90 parts of an ordinary Portland cement and admixed with 200 parts of a natural sand, 40 parts of water and 1.2 parts of a retarder (a mixture composed of 13% of sodium gluconate 17% of citric acid and 70% of potassium carbonate) in an ordinary manner. The admixture was put into a 4×4×16 cm mold box, and the H.T. thereof and the compressive strengths after 1, 3 and 24 hours were measured. The results are shown in Table 1.

Table 1

| Run No. | Water content (%) | H.T. (min.) | Compressive Strength ($kg/cm^2$) | | |
|---|---|---|---|---|---|
| | | | 1 hr. | 3 hr. | 24 hr. |
| 1 | 0 | 3 | 40 | 48 | 260 |
| 2 | 0.15 | 14 | 51 | 65 | 289 |
| 3 | 0.30 | 21 | 67 | 67 | 280 |
| 4 | 0.80 | 30 | 69 | 73 | 283 |

Experiments were repeated similarly as described above except that the mixture composed of 20 parts each of the cement rapid hardening agents and 80 parts of the same ordinary Portland cement were used in place of the 10 part-90 part mixture stated above. The results are shown in Table 2.

Table 2

| Run No. | Water Content (%) | H.T. (min.) | Compressive Strength ($kg/cm^2$) | | |
|---|---|---|---|---|---|
| | | | 1 hr. | 3 hr. | 24 hr. |
| 5 | 0 | Set Instantaneously | 151 | 195 | 476 |
| 6 | 1.5 | 24 | 170 | 223 | 467 |
| 7 | 1.8 | 40 | 170 | 218 | 464 |

EXAMPLE 2

340 parts of an ordinary Portland cement, 60 parts of a cement rapid hardening agent having the Blaine value of 5500 $cm^2/g$ prepared by mixing an amorphous calcium aluminate composed of 44.0% of CaO and the balance of $Al_2O_3$ as the main component with Type II anhydrous calcium sulfate in a mixing ratio of 1:2 by weight, 800 parts of a natural river sand, (Finess Modulus: 2.8), 156 parts of water and 2.4 to 5.6 parts (0.6 to 1.4% relative to the weight of the rapid hardening cement) of each of the retarders set forth in Table 3 were mixed together and mixed for 1 minute. The setting initiation time of each mortars at 30° C. was measured. The results are shown in FIG. 1.

The compressive strengths of the mortars added with 0.6% of respective retarders after ageing for the time periods specified in Table 3 (ageing time period starting from the initiation of setting) were measured. The results are shown in Table 3.

Table 3

| Run No. | Composition of Retarder (%) | | | Compressive Strength ($kg/cm^2$) | | | |
|---|---|---|---|---|---|---|---|
| | Sodium Gluconate | Citric Acid | Potassium Carbonate | 1 hr. | 3 hr. | 1 day | 7 days |
| 8 | 7 | 23 | 70 | 82 | 175 | 305 | 540 |
| 9 | 13 | 17 | 70 | 81 | 185 | 325 | 593 |
| 10 | 20 | 0 | 80 | 63 | 150 | 295 | 480 |
| 11 | 0 | 25 | 75 | 88 | 173 | 310 | 545 |
| 12 | 30 | 20 | 50 | 23 | 71 | 273 | 490 |
| 13 | 10 | 40 | 50 | 36 | 95 | 285 | 505 |

A further experiment was conducted following the general procedure set forth in Run No. 8 except that tartaric acid was used in place of sodium gluconate. The result was substantially equivalent to that of Run No. 8.

EXAMPLE 3

Compositions of the concretes used in Run Nos. 14 to 20 are shown in Table 4. The cement rapid hardening agent used in this example comprises an amorphous calcium aluminate composed of 40.5% of CaO and the balance of $Al_2O_3$ as the main component and having the Blaine value of 4000 $cm^2/g$, and a Type II anhydrous calcium sulfate having the Blaine value of 6000 $cm^2/g$ added in an amount of 2 times by weight of said amorphous calcium aluminate. The retarder used in this example is composed of 7% of sodium gluconate, 23% of citric acid and 70% of potassium carbonate.

The materials specified above were mixed as follows. Firstly, the retarder was dissolved in water using about 90% of water to be added, and the obtained solution was poured into a forced mixer preliminarily charged with an aggregate while agitating and continued mixing for about 20 seconds to allow the aggregate to be uniformly wetted with the solution of the retarder. Then an ordinary Portland cement and the cement rapid hardening agent specified above were added and mixed for 2 minutes. The water which had been set aside and which was equal to about 10% of the water to be added, was added little by little during the mixing process while visually measuring and controlling to obtain the aimed slump value.

Table 4

| Run No. | Cement Rapid Hardening Agent (%) | G Max (mm) | Slump Value (cm) | W/C (%) | S/A (%) | Unit Amount (kg/m³) | | | | | |
|---|---|---|---|---|---|---|---|---|---|---|---|
| | | | | | | Water | Cement | Cement Rapid Hardening Agent | Sand | Gravel | Retarder |
| 14 | 15 | 10 | 6 ± 1 | 43 | 60 | 176 | 349 | 61 | 1039 | 692 | 4.1 |
| 15 | 10 | 10 | 6 ± 1 | 43 | 60 | 176 | 369 | 41 | 1039 | 692 | 3.3 |
| 16 | 0 | 10 | 6 ± 1 | 48 | 46 | 187 | 390 | 0 | 825 | 968 | 0 |
| 17 | 15 | 10 | 5 ± 1 | 43 | 46 | 168 | 332 | 58 | 845 | 992 | 3.9 |
| 18 | 10 | 10 | 10 ± 1 | 43.6 | 46 | 170 | 351 | 39 | 841 | 988 | 3.9 |
| 19 | 15 | 10 | 7 ± 1 | 43.6 | 46 | 170 | 332 | 58 | 841 | 988 | 3.1 |
| 20 | 20 | 20 | 18 ± 1 | 37 | 40 | 185 | 400 | 100 | 683 | 1024 | 6 |

Note:
G max stands for maximum size of gravel used, W/C for a water-cementratio and S/A for fine aggregate percentage.

From the concretes set forth in Example 3, steel bar concrete pipes were produced by the centrifugal molding method. Each pipe has the dimensions of 200 mm in outer diameter and 300 mm in length and is reinforced with a steel bar cage which has the dimensions of 190 mm in outer diameter and 290 mm in length and which is formed by 9 turns of a 4 mm$\phi$ helical wire and 10 longitudinally extending 3 mm$\phi$ steel bars. The centrifugal molding is accomplished for a total processing period of 10 minutes including the steps of processing at a low speed (Gravity No. 3) for 2 minutes, processing at a medium speed (Gravity No. 10.5) for 2 minutes and processing at a high speed (Gravity No. 30) for 6 minutes.

The cracking load and the breaking load of each of the centrifugally molded steel bar concrete pipes was measured by applying loading thereto while placing 5 mm thick rubber plates on the top and beneath the bottom of the pipe. Also, the bending tensile strength $\sigma_{bt}$(kg.f/cm²) was calculated from the following formula:

$$\sigma_{bt} = \frac{0.318 Pr}{\frac{h^2}{6}};$$

wherein P is the cracking load (kgf), r is the radius measured along the line connecting the center of the pipe and the center of the pipe wall, l is the length of the pipe and t is the thickness of the pipe wall.

The concretes denoted by Run Nos. 14 and 15 were gelatinized for about 40 minutes after mixing and hardened in about 50 minutes. The compressive strengths of 10$\phi$×20 cm samples, which had been cured at 20° C. in an air-conditioned room maintained at 80% RH, were measured. The results are shown in Table 5.

Table 5

| Run No. | 3 hr. | 1 day | 3 days | 7 days | 28 days |
|---|---|---|---|---|---|
| 14 | 100 | 196 | 305 | 363 | 403 |
| 15 | 48 | 187 | 282 | 331 | 373 |

Centrifugally molded steel bar concrete pipes having the walls of 26 mm in thickness were formed from the same concretes and the properties thereof were measured. The results are shown in Table 6.

Table 6

| Run No. | Property | 1 day | 7 days |
|---|---|---|---|
| 14 | Cracking Load (kgf/m) | 4,830 | 6,130 |
| | Breaking Load (kgf/m) | 13,830 | 16,600 |
| | $\sigma_{bt}$(kgf/cm²) | 119 | 151 |
| | Cracking Load (kgf/m) | 4,130 | 4,800 |

Table 6-continued

| Run No. | Property | 1 day | 7 days |
|---|---|---|---|
| 15 | Breaking Load (kgf/m) | 13,730 | 16,700 |
| | $\sigma_{bt}$(kgf/cm²) | 102 | 118 |

In the meanwhile, Japanese Industrial Standard A-5303 (revised in 1976) prescribes that a concrete pipe having the wall thickness of 26 mm and the nominal diameter of 150 mm shall withstand an external pressure such that the cracking load thereof be more than 1,600 kgf/m, and the breaking load thereof be more than 2,500 kgf/m.

The cement rapid hardening agent according to the present invention is not added to the concrete composition of Run No. 16, and hence Run No. 16 is a Comparative Example.

After pre-steaming for 3 hours, samples made of this concrete were heated to raise the temperature thereof at the rate of 15° to 20° C./hr, and then subjected to steam curing at 65° C. for 4 hours. The compressive strength of a 10 cm$\phi$×20 cm sample after ageing for 1 day was 229 kgf/cm² and the cracking load of a centrifugally molded steel bar concrete pipe having a wall thickness of 43.4 mm was 2,850 kgf/m and the bending tensile strength $\sigma_{bt}$ of the same pipe was 75 kgf/cm².

The concrete of Run No. 17 was subjected to tests in a room kept at 3°±2° C. The results were that the gel. time thereof was 30 minutes and the hardening time thereof was 40 minutes. Mechanical properties of a 10 cm$\phi$×20 cm sample and a centrifugally molded steel bar concrete pipe were measured. The results are shown in Table 7.

Table 7

| Sample | Centrifugally Molded Steel Bar Concrete pipe | | | | |
|---|---|---|---|---|---|
| Ageing Strength (kgf/cm²) | 3 hr. Compression | 1 day Compression | 1 day $\sigma_{bt}$ Buckling | 7 days in water $\sigma_{bt}$ Buckling | |
| | 107 | 136 | 78  274 | 165  587 | |

From the test results shown in the above Table, it should be appreciated that the bending tensile strength $\sigma_{bt}$ has been greatly increased after ageing for 7 days, nevertheless curing is effected in cold water the temperature of which is 3°±2° C.

A centrifugally molded steel bar concrete pipes having the wall thicknesses of 40±3 mm and 10×10×40 cm samples were prepared from the concrete of Run No. 18. The molded bodies were allowed to stand for 1 day in a room kept at 10° to 5° C. Thereafter, they were separately subjected to dry curing at 20° C. and 40 to 50% RH and the water curing in order to clarify the effects of curing steps. The results are shown in Table 8.

Table 8

| Curing | Ageing 1 day Strength | | 2 weeks Strength | | |
|---|---|---|---|---|---|
| | Bending $\sigma_{bt}$ | | Bending $\sigma_{bt}$ | | Buckling |
| Dry(kgf/cm²) | 52 | 83 | 50 | 84 | 549 |
| Water (kgf/cm²) | — | — | 88 | 164 | 538 |

It should be apparent from the results set forth above that the molded bodies may withstand an external pressure of higher level when they are cured in water or cured with supplied water.

Using the same concrete, a 10 cm$\phi$×20 cm sample was molded and immediately cured at the room temperature of 20° C. The compressive strength of the sample after ageing for 1 day was 200 kgf/cm². In view of the fact that the compressive strength stated just above is higher than that obtained in Run No. 17 despite that the composition of Run No. 18 contains the cement rapid hardening agent of the invention only in an amount lesser by 5% as compared with that contained in the composition of Run No. 17, it is effective for obtaining higher strength to keep the molded body warm in the early stage.

The concrete of Run No. 19, which contains a decreased amount, say 0.8%, of the retarder, is gelatinized for 25 minutes and hardened for 30 minutes. Using this concrete (the temperature at the time when the mixing had been completed being 15°-17° C.), a 10 cm$\phi$×20 cm sample and a centrifugally molded steel bar concrete pipe were formed, which were kept warm at 20°-30° C. for 4 hours, then allowed to age for 1 day in a room kept at 15°-10° C., and thereafter cured in water for 3 days. The test results are shown in Table 9.

Table 9

| Ageing | 4.5 hr. | | | 1 day | | | 3 days | |
|---|---|---|---|---|---|---|---|---|
| Strength | Comp. | $\sigma_{bt}$ | Buckling | Comp. | $\sigma_{bt}$ | Buckling | $\sigma_{bt}$ | Buckling |
| (kgf/cm²) | 127 | 65 | 240 | 189 | 116 | 352 | 169 | 413 |

The concrete composition of Run No. 20 is remarkably different from that normally used for forming a steel bar pipe by the centrifugal molding method. The concrete of Run No. 20 was mixed at the room temperature of 1°-2° C. The temperature of the concrete at the time when the mixing had been completed was 6° C. 10 cm$\phi$×20 cm samples were formed and the compressive strengths of the samples after ageing for 15 hours at the temperatures set forth in Table 10 were measured. The results are shown in the Table. The gel time of all samples were 40 to 50 minutes. However, the time period required for hardening the samples was varied depending on the curing temperature in that the time period required for hardening the same at 1°-0° C. was 130 to 160 minutes whereas the time period required for hardening the same at 20° C. was 70 to 90 minutes.

Table 10

| Curing Temp. | (°C.) | 1-0 | 5 | 10 | 20 |
|---|---|---|---|---|---|
| Compressive Strength | (kgf/cm²) | 85 | 135 | 195 | 245 |

EXAMPLE 4

Various cement rapid hardening agents were prepared by changing the CaO content of the amorphous calcium aluminate and the calcium sulfate ratio, i.e. the added amount by weight of Type II anhydrous calcium sulfate based on the weight of the amorphous calcium aluminate. Specific surface areas of the cement rapid hardening agents were 5900 cm²/g. 10% and 20% of respective agents noted above were mixed with 90% and 80% of ordinary Portland cement, respectively, to prepare rapid hardening cements. A cement retarder, which was a mixture composed of 13% of sodium gluconate, 17% of citric acid and 70% of potassium carbonate, was added in an amount of 0.8% based on the weight of the rapid hardening cements thus prepared. 100 parts by weight of each rapid hardening cement was mixed with 200 parts by weight of sands and mixed at a water-cement ratio of 41% to obtain a mortar which was molded and aged for 3 hours.

Figure 2:
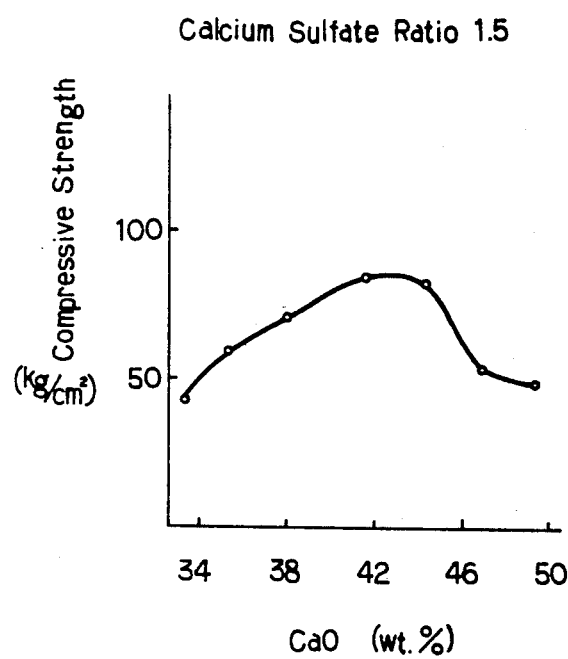
FIGS. 2 and 3 each show the measured compressive strengths of the hardened mortars in terms of the variations in composition of the used cement rapid hardening agents.
Figure 3:
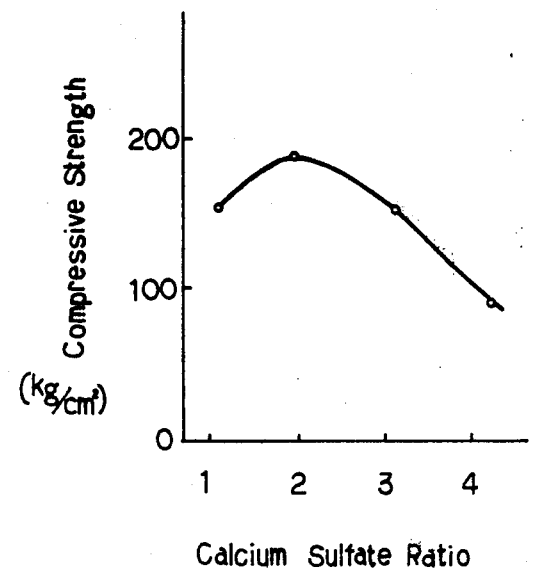

The compresive strengths of the mortars thus obtained were then measured. FIG. 2 shows the compressive strengths of the mortars (10% cement rapid hardening agent and 90% of ordinary Portland cement) at a calcium sulfate ratio of 1.5 (Type II anhydrous calcium sulfate: amorphous calcium aluminate=1.5:1). FIG. 3 shows the compressive strengths of the mortars (20% of cement rapid hardening agent and 80% of ordinary Portland cement), the CaO content of the amorphous calcium aluminate being 42%.

From FIG. 2 it will be understood that when the CaO content contained in the amorphous calcium aluminate is within the range of 35 to 47%, particularly 38 to 44%, sufficient compressive strengths are obtained. Alternatively, it will be understood from FIG. 3 that calcium sulfate ratio of 1 to 3, particularly 1.5 to 2.5 gives satisfactory compressive strengths.

In the meanwhile, the surfaces of the thus obtained hardened bodies after ageing for one day were observed and found that no spots were formed thereon.

While the present invention has been described with reference to specific examples thereof, the invention may be embodied in other specific forms without departing from the spirit or essential characteristic thereof. The examples set forth above are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A rapid hardening cement comprising a cement rapid hardening agent, a cement and a cement retarder and/or water, said cement rapid hardening agent comprising an amorphous calcium aluminate and an inorganic sulfate in an amount of 1 to 3 times by weight as that of said amorphous calcium aluminate, the chemical composition of said amorphous calcium aluminate consisting essentially of 35 to 47% by weight of calcium oxide based on the weight of said amorphous calcium aluminate and the balance of aluminum oxide, said cement retarder comprising 5 to 20% by weight, based on the weight of said retarder, of gluconic acid and/or tartaric acid and/or a water soluble salt thereof, 30 to 10% by weight, based on the weight of said retarder, of citric acid and/or an alkali salt thereof, and 50 to 85% by weight, based on the weight of said retarder, of an alkali carbonate, and said water being added in an amount of 2% or less by weight based on the weight of said cement rapid hardening agent.

2. The rapid hardening cement as claimed in claim 1, wherein the chemical composition of said amorphous calcium aluminate consists essentially of 38 to 44% by weight of calcium oxide based on the weight of said amorphous calcium aluminate and the balance of aluminum oxide.

3. The rapid hardening cement as claimed in claim 1, wherein said inorganic sulfate is added in an amount of 1.5 to 2.5 times by weight as that of said amorphous calcium aluminate.

4. The rapid hardening cement as claimed in claim 1, 2, or 3, wherein said inorganic sulfate is selected from one or more of the group consisting of dihydrate, hemihydrate and anhydride of calcium sulfate, sodium sulfate, potassium sulfate and magnesium sulfate.

5. The rapid hardening cement as claimed in claim 4, wherein said anhydrous calcium sulfate is Type II anhydrous calcium sulfate.

6. The rapid hardening cement as claimed in claim 1, 2 or 3, wherein the amount of said cement rapid hardening agent is 5 to 25% by weight based on the total amount by weight of the rapid hardening cement.

7. The rapid hardening cement as claimed in claim 1, 2 or 3, wherein said cement is selected from one or more of the group consisting of ordinary Portland cement, high early strength Portland cement, super rapid hardening Portland cement, moderate heat Portland cement and a mixture thereof with silica, fly ash, blast furnace slag and a mixture thereof.

8. The rapid hardening cement as claimed in claim 1, wherein said water soluble salt of gluconic acid and/or tartaric acid is selected from one or more of the group consisting of sodium gluconate, potassium gluconate, calcium gluconate, sodium tartrate, potassium tartrate and calcium tartrate.

9. The rapid hardening cement as claimed in claim 1, wherein said alkali salt of citric acid is selected from one or more of the group consisting of sodium citrate, potassium citrate and calcium citrate.

10. The rapid hardening cement as claimed in claim 1 wherein said alkali carbonate is selected from one or more of the group consisting of sodium carbonate, potassium carbonate, sodium hydrogencarbonate and potassium hydrogencarbonate.

11. The rapid hardening cement as claimed in claim 1, wherein said cement retarder is added in an amount of 0.3 to 1.5% by weight based on the total amount by weight of the rapid hardening cement.

* * * * *